March 4, 1958  W. F. ALBRECHT  2,825,529
FAUCET
Filed Feb. 16, 1954

INVENTOR.
William F. Albrecht
BY Victor J. Evans & Co.
ATTORNEYS

2,825,529

FAUCET

William F. Albrecht, Salt Lake City, Utah

Application February 16, 1954, Serial No. 410,643

2 Claims. (Cl. 251—277)

This invention relates to a faucet.

The object of the invention is to provide a faucet or valve which will provide a positive and quick control for fluid flow such as the flow of water.

Another object of the invention is to provide a faucet which may be of a single or multiple unit type wherein it will be impossible to short circuit the hot and cold water and wherein the faucet can be used for an indefinite length of time without the necessity of major repairs thereto.

A still further object of the invention is to provide a faucet which is constructed so that there will be no contamination of the water whereby a sanitary condition will prevail at all times and wherein the valve seats or discs can be readily replaced or changed as desired, there being a means for preventing any water from flowing back from the live side of a double single spout faucet when the other side is dry and open so that water will not run backwards down the dry side of the faucet while making repairs and the like anywhere on the dry side system.

A further object of the invention is to provide a faucet which is extremely simple and inexpensive to manufacture.

Other objects and advantages will be apparent during the course of the following description.

In the accompanying drawings, forming a part of this application, and in which like numerals are used to designate like parts throughout the same:

Figure 1:
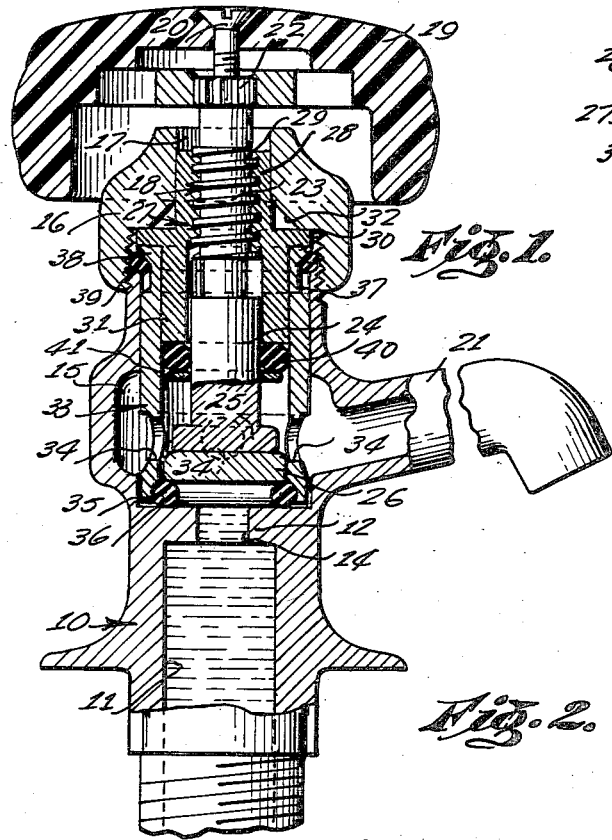
Figure 1 is a side elevational view of a faucet constructed according to the present invention, and with parts broken away and in section.
Figure 2:
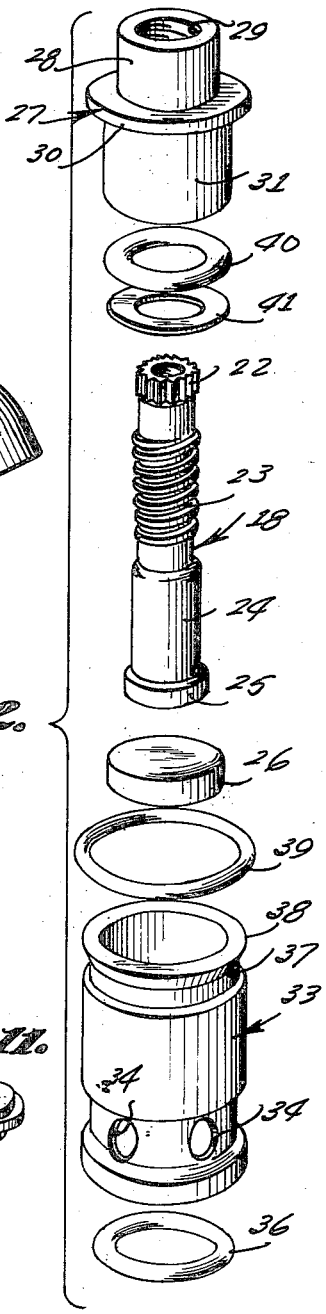
Figure 2 is a fragmentary perspective exploded view showing the parts of the faucet of Figure 1.
Figure 3:
Figures 3 through 11 are perspective views showing different types of seats or discs that can be used in the faucet.
Figure 4:
Figure 5:
Figure 6:

Referring in detail to Figures 1 and 2 of the drawings, the numeral 10 designates a housing that can be made of any suitable material, and the housing 10 is provided with a chamber 11 which is adapted to be connected to a suitable source of fluid such as water. Arranged within the housing 10 is a shoulder 12 which is provided with a central opening 14, Figure 1. Arranged above the shoulder 12 within the housing 10 is a compartment 15 for a purpose to be later described. A cap nut 16 is arranged in threaded engagement with the upper end of the housing 10, and the cap nut 16 is provided with a central opening 17 through which projects a stem 18. A handle 19 is secured to the upper end of the stem 18 as for example by means of the securing element 20. A discharge spout 21 extends from the housing 10 and communicates with the compartment 15.

The stem 18 is shown in detail in Figure 2, and the stem 18 includes a serrated portion 22 which is adapted to be engaged by a member on the handle 19 so that when the handle 19 is rotated the stem 18 will also be rotated. The stem 18 further includes an exteriorly threaded portion 23, and an enlarged section 24 and an enlarged head 25 on its lower or inner end. The head 25 is adapted to engage or abut a disc or seat 26.

The faucet further includes a sleeve 27 which comprises an upper cylindrical portion 28 that is threaded interiorly as at 29, and the threaded interior portion 29 is arranged in threaded engagement with the threaded exterior 23 of the stem 18. The sleeve 27 further includes an annular flange 30 which is adapted to abut a shoulder 32 on the cap nut 16. The sleeve 27 further includes a lower cylindrical portion 31.

Positioned within the housing 10 is a body member or cage 33 which is provided with a plurality of spaced apertures 34 therein for the passage therethrough of water. An annular recess 35 is arranged within the body member 33 adjacent its lower end, and a ring 36 is seated in the recess 35. The ring 36 is made of a yieldable material such as rubber or synthetic material, and the lower portion of the O shaped ring 36 extends slightly below the bottom of the body member 33 as shown in Figure 1 for a purpose to be later described. The ring 36 is adapted to be engaged by the disc 26. When the disc 26 is in the position shown in Figure 1 passage of water through the faucet is prevented, and when the disc 26 moves away from the ring 36, water can flow from the chamber 11 through the opening 14, through the ring 36, and then through the apertures 34 and out through the discharge nozzle 21. The upper exterior portion of the body member 33 is provided with an annular recess or groove 37, and there is provided a flaring or tapering section 38 just above the recess 37. An O ring 39 of yieldable material is seated in the recess 37 and abuts the top of the housing 10.

Circumposed on the stem 18 is an O ring 40 of yieldable material, and arranged below the ring 40 is a washer 41.

From the foregoing it is apparent that there has been provided a faucet which will effectively control the flow of fluid such as water therefrom. With the parts arranged as shown in Figure 1, flow of water out of the faucet is prevented since the disc 26 is held down on the ring 36. When water is to be discharged through the nozzle 21, the handle 19 is rotated to thereby rotate the stem 18 so that the head 25 on the stem moves up off of the disc 26. Then, water can flow from the chamber 11 through the opening 14 and then through the ring 36. This water pressure then raises the seat or disc 26 off of the ring 36 and the water flows out through the apertures 34 and then through the nozzle 21. Depending on how far the stem 18 is rotated, the upward movement of the disc 26 can be limited so that the quantity of water issuing through nozzle 21 can be regulated. As a further means of regulating the flow of water through the nozzle 21, different sizes and shapes of discs can be used instead of the disc 26 to provide a means of controlling the water passing through nozzle 21 when the handle 19 is rotated. Thus, any of the discs or seats 42, 43, 44, 45, 46, 47, 48, 49 shown in Figures 3 through 11 can be used instead of the disc 26 and these discs are readily inserted or replaced.

The faucet of the present invention can be installed in new equipment or used as replacements for old fittings.

Figure 7:
Figure 8:
Figure 9:
Figure 10:
Figure 11:

The upper ring 39 prevents leakage of fluid through the adjacent parts. The discs are free floating and are not attached to the stem. Thus, these discs can check the flow of water coming or going. Thus, when the stem 18 is moved all the way in the disc will seat against its adjacent ring to block or prevent flow of water, and these free floating discs will also act as a back check valve to prevent water from the housing from accidentally entering the discharge line. Thus, there will be no short circuiting of the hot and cold water line in any kind of a multiple casting which supplies hot and cold water and also the present invention will prevent short circuiting in the event that a soft water supply line was connected from a well such as in a triple unit assembly. Various thicknesses and shapes of seats or discs can be used as shown in Figures 3 through 11. The disc in Figure 11 is indicated by the numeral 78. Thus, in a high pressure water system the excess pressure of flow through the spout 21 can be reduced by increasing the thickness of the disc as shown in Figure 7 and as indicated by the numeral 46 so that the forces or volume of water will be reduced to a more suitable working condition. On a low pressure system the thickness of the disc 26 can be thinned down to permit greater flow of water and as for example the thinned disc 42 can be used. Where sandy or gritty water is being utilized two or more of the seats or discs can be used. The seats or discs can be reversed and removed instantly without any delay and without any waste of water so that an economy will result. Furthermore, the effective length of the main valve stem can be increased by using additional discs and old castings can be reconditioned with the parts of the present invention. No special tools are required to change the discs and the parts can be made of any suitable material. The discs are bifacial and reversible so that when one side becomes worn the disc can be turned over and used on the other side.

Thus, it will be seen that there has been provided a combination reversible pressure disc and back water check valve which will prevent short circuits and the parts can be used in a double or triple valve, single spout faucet all at the same time and is not of complicated construction and is sanitary to use. The various yieldable rings can be made of any suitable material such as rubber or synthetic material. The size or number of the apertures in the body member can be varied to control the flow of water and by using two discs at one time sandy or gritty water can be compensated for since in the event that one of the discs wears out the other one will still provide a control. The unit will work in a horizontal or vertical position. The disc 42 is a thin disc, while the discs 43, 44, 45 and 46 may be of slightly greater thickness. These discs can be used to limit the amount of water flowing from the faucet and can be used for controlling the flow of water in a tall building so that each floor can get only a desired amount of water by the provision of a limited opening for each floor in each faucet or unit. The discs 47 and 49 can be used to provide quick or slow control of water on different sides of the disc. The angular cutout 38 in the body member 33 provides a compression and an outward movement for the upper ring 39 to form a tight joint on top of the casting. When the cap nut 16 is screwed down tight at the same time it covers a wider circumference should the casting be a fractional size larger than the unit itself. With this construction the barrel or body member will be held tight and will not accidentally move. The recess 35 holds the ring 36 and the ring 36 touches the shoulder 12. When the parts are moved to the position shown in Figure 1 the disc 26 automatically compresses the washer or ring 36 against the shoulder 12 to thereby seal the unit at the base of the casting and shut off the water in the faucet which is a double feature action since both sides of the ring 36 are shut off at the same time. Should the water be cut off suddenly while the faucet is open the disc 26 when in an upright position would automatically close the faucet from any intrusion and would also stop back flow water from the live side of a double single spout faucet when the other side is dry and open so that water will be pervented from running backwards down the dry side of the faucet while making repairs and the like somewhere on the dry side system. The ring 40 divides the inside of the body member into an upper and lower chamber, and the upper chamber is used to receive the journal or sleeve 27 the flange 30 is large enough to cover the top of the body member 33. The stem 18 is enlarged as at 24 to maintain the friction ring 40 in its proper place and also to provide longer wear which would result from shutting off the valve against the top of the seat as in a swivel action. The disc comes down upon the ring 36 without a grind so that the ring or washer 36 can stand a lot of wear and its natural resiliency causes it to rebound and be long wearing.

It will be understood that modifications, within the scope of the appended claims, may be made in the design and arrangement of the parts without departing from the spirit of the invention.

I claim:

1. In a faucet, a housing provided with a fluid inlet chamber, a shoulder arranged within said housing contiguous to said chamber and provided with a central opening for the passage therethrough of fluid, there being a compartment in said housing, a discharge spout extending from said housing and communicating with said compartment, a cap nut arranged in threaded engagement with said housing and provided with a central opening, a stem extending through the opening in said cap nut, a handle connected to the outer end of said stem, said stem including an intermediate threaded portion, an enlarged section and an enlarged head, a sleeve having an upper portion projecting through the opening in said cap nut, the upper portion of said sleeve being threaded interiorly and engaging the threaded portion of said stem, said sleeve further including an annular flange and a lower cylindrical portion, a first yieldable ring circumposed on said stem and abutting the inner end of said sleeve, a washer arranged contiguous to the bottom of said ring, a body member surrounding the lower portion of said sleeve and abutting said flange, there being an annular recess in the exterior of said body member at the top thereof, a second ring seated in said recess and abutting said housing, said body member being provided with a plurality of spaced apertures for the passage therethrough of fluid, a disc positioned in said body member and adapted to be engaged by the head on said stem, there being an annular recess in the interior of said body member at the lower end thereof, and a third yieldable ring seated in said last named recess and engaging said shoulder.

2. In a faucet, a housing provided with a fluid inlet chamber, a shoulder arranged within said housing and provided with an opening for the passage therethrough of fluid, there being a compartment in said housing, a discharge spout extending from said housing and communicating with said compartment, a securing element arranged in threaded engagement with said housing and provided with a central opening, a stem extending through the opening in said securing element, a handle connected to said stem, said stem including a threaded portion, an enlarged section, and an enlarged head, a sleeve having an upper portion projecting through the opening in said securing element, the upper portion of said sleeve engaging the threaded portion of said stem, said sleeve further including a flange and a cylindrical portion, a first ring circumposed on said stem and abutting the inner end of said sleeve, a washer arranged contiguous to the bottom of said ring, a body member surrounding the lower portion of said sleeve and abutting said flange, there being a recess in the exterior of said body member at the top thereof, a second ring seated in said recess and abutting said housing, said body member being provided with a plurality of apertures for the passage therethrough of fluid, a disc positioned in said body member and adapted to be engaged by the head on said stem, there being a recess in the interior of said body member, and a third ring seated in said last named recess and engaging said shoulder.

References Cited in the file of this patent
UNITED STATES PATENTS

| | | | |
|---|---|---|---|
| 595,877 | Glauber | Dec. 31, | 1897 |
| 956,860 | Lawler | May 3, | 1910 |
| 1,024,729 | Lawler | Apr. 30, | 1912 |
| 1,434,963 | Rogert | Nov. 7, | 1922 |
| 1,793,850 | Halstead | Feb. 24, | 1931 |
| 2,368,206 | Du Charme | Jan. 30, | 1945 |
| 2,616,653 | Tarr | Nov. 4, | 1952 |
| 2,646,821 | Johansson et al. | July 28, | 1953 |
| 2,692,750 | Davis | Oct. 26, | 1954 |